Patented Dec. 23, 1947

2,433,285

UNITED STATES PATENT OFFICE 2,433,285

STARCH FOR TUB SIZING PAPER

John C. Marrone, Woodbury, Conn., assignor to A. M. Meincke & Son, Inc., a corporation of Illinois No Drawing. Application April 21, 1944, Serial No. 532,212

5 Claims. (Cl. 127—32)

This invention relates to tub sizing paper and more particularly to a method of tub sizing in which all or a substantial portion of the ordinary starch or glue is replaced by a cold swelling starch This application is a continuation in part of my co-pending application Serial No. 491,675, filed June 21, 1943, now abandoned.

In the manufacture of paper, after the pulp has been formed into a web on the wire or screen, it is partially dried and then, before being air dried, immersed in a bath of starch or glue (such as casein glue). This is known as "tub sizing" and its purpose is to strengthen the paper, for example in respect to its mullen and resistance to fold.

In the previous practice the customary bath was 100 lbs. of starch to 100 gallons of water. In making up the bath with the starch of the prior art it is necessary to boil the starch in order to make it soluble, which requires not only the use of heat and labor, but also the treatment of the starch with an enzyme used as a converting agent to produce a solution suitable for tub sizing.

I have discovered that for each pound of cold swelling starch added to the tub sizing bath, approximately 2 lbs. of the ordinary starch may be removed and the resulting bath will produce a better paper than did the previous bath.

For example, a bath may be prepared by using 60 lbs. of common starch and 20 lbs. of a cold swelling starch prepared from corn starch, to 100 gals. of water. The cold swelling starch is a common article of commerce and may be produced, for example, by the process of Oltmans Patent No. 2,105,052. This bath of 60 lbs. common starch and 20 lbs. cold swelling starch produced better paper for a longer period of time than did the same bath on the same kind of paper when employing 100 lbs. of common starch to 100 gals. of water.

Furthermore, it has been discovered that when employing a substantial portion of cold swelling starch the bath may be diluted considerably and still produce a paper of equal or better quality. Thus whereas the ordinary starch concentration is about 12.5%, this may be reduced to 6% or even as low as 4% when employing cold swelling starch. A bath comprising 150 to 160 lbs. of cold swelling corn starch to 300 gals. of water produces a remarkably effective tub size comparing favorably with that produced by 300 lbs. of common starch in 300 gals. of water. The cold swelling starch may, however, be used in higher concentrations, as, for example, 60 to 70 lbs. for 100 gals. of water.

In preparing the cold swelling starch for tub sizing it is essential that the temperature of the bath be carefully controlled so that the starch has been exposed to water at a temperature sufficient to produce a smooth, thoroughly free flowing film free from granules and particles. This normally requires a temperature of at least 185° F. for a period of about five minutes. The temperature may go higher than this, but if too high a temperature is employed the starch will deteriorate. Normally a temperature of less than 200° is preferred.

For example, a bath may be prepared by dissolving ⅔ of a pound of cold swelling starch per gallon of water, the starch being added to the water while agitating. The water initially may be ordinary room or tap temperature. After the starch has been added and the mixture thoroughly agitated for five minutes, heat is applied either as live steam directly to the bath or by external means. The rate of heating is not important. After the bath reaches 185° F., it is held there for approximately five minutes. The bath is then cooled sufficiently to permit its use in the tub sizing machinery. Ordinarily this means that a temperature of 120° to 145° F. will be used, depending upon the machinery of the particular plant. Cooling is ordinarily accomplished by adding additional water to reduce the concentration of the starch to ½ pound per gallon.

On the other hand, if the bath is to be a composite bath of cold swelling starch and ordinary starch, the raw starch may be suitably prepared in any desired manner and in accordance with established practice, while the cold swelling starch bath is prepared as just described. The two starch baths may then be mixed in the desired proportions.

On the other hand, if the ordinary preparation of the raw starch includes heat treatment within the prescribed limits, the two starch materials may be incorporated in the same bath and the usual raw starch treatment followed. Ordinarily this means the dispersion of the raw starch in the cold water, the addition of a suitable enzyme in proportion to work on the raw starch (no enzyme is added for the cold swelling starch) followed by heating to approximately 167° F., holding at that temperature for ten to fifteen minutes for the enzyme to work and then bringing it to 205° F. and holding for five minutes to kill the enzyme.

The foregoing detailed description has been given for clearness of understanding only, and no unnecessary limitations should be understood therefrom.

What I claim as new and desire to secure by Letters Patent is:

1. In preparing cold swelling starch for treatment of paper, the method which comprises dispersing cold swelling starch in cold water while agitating vigorously, and then heating the dispersion to a temperature of approximately 185° F. and maintaining it at that temperature for about five minutes to produce a dispersion capable of producing a free flowing film free from granules.

2. The method as set forth in claim 1 in which the dispersion is maintained at a temperature between 185° and 205° F. for a period of about five minutes.

3. In the tub sizing of paper in which cold swelling starch is employed as an ingredient of the tub sizing bath, the step of maintaining a starch dispersion comprising the cold swelling starch in aqueous environment at a temperature of 185° to 205° F. for a period of five minutes and then cooling prior to the tub sizing of paper therein.

4. The method as set forth in claim 3 in which the bath comprises approximately 60 lbs. of common starch for each 20 lbs. of cold swelling starch.

5. The method as set forth in claim 3 in which the concentration of cold swelling starch in the dispersion is from about 50 to 70 pounds per 100 gallons of water.

JOHN C. MARRONE.

REFERENCES CITED

The following references are of record in the file of this patent:

UNITED STATES PATENTS

| Number | Name | Date |
|---|---|---|
| 1,998,758 | Holt et al. | Apr. 23, 1935 |
| 2,105,052 | Oltmans | Jan. 11, 1938 |
| 2,348,685 | Smith et al. | May 9, 1944 |
| 2,357,650 | Hall | Sept. 5, 1944 |

OTHER REFERENCES

Cotton, volume 89 (No. 1, Nov. 1924), pp. 47, 49. (Copy in 127–32.)